Figure 1:
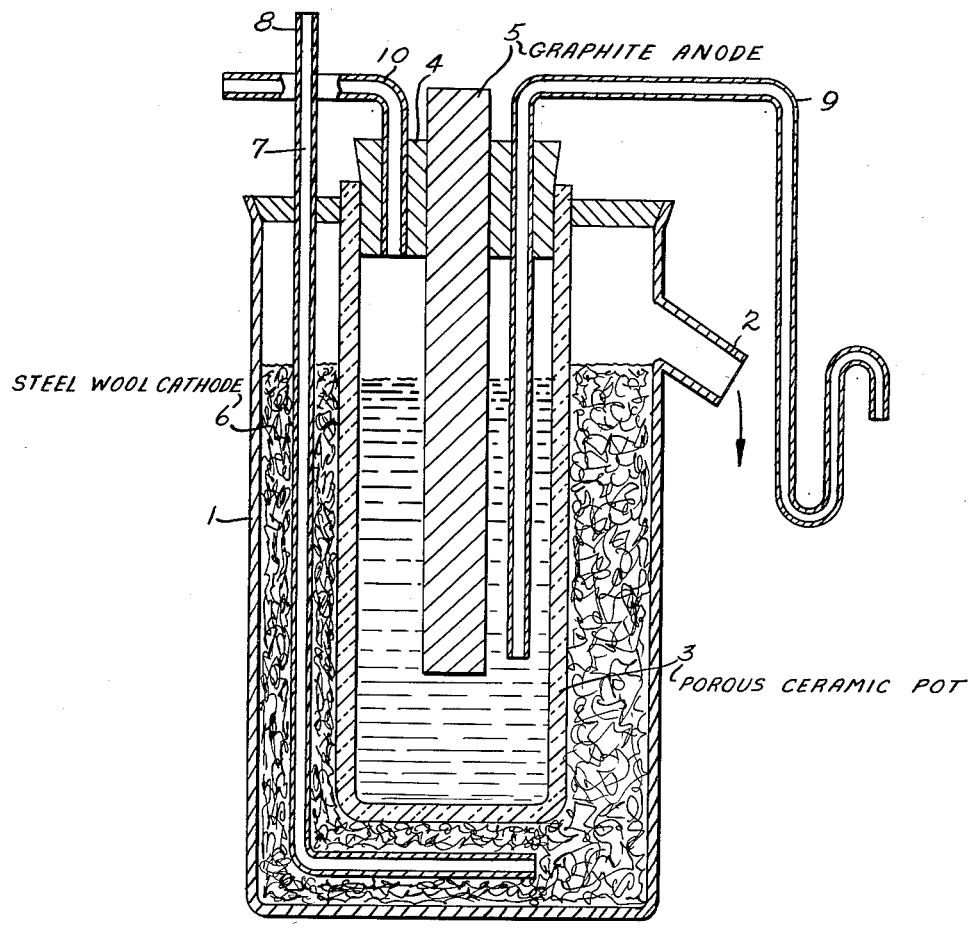

Aug. 27, 1963 G. E. EDWARDS ETAL 3,102,085
TREATMENT OF BRINE SOLUTIONS
Filed June 18, 1959 5 Sheets-Sheet 1

INVENTORS
GEORGE ERNEST EDWARDS
NORMAN JAMES LE PAGE
BY: Cushman, Darby & Cushman
ATTORNEYS

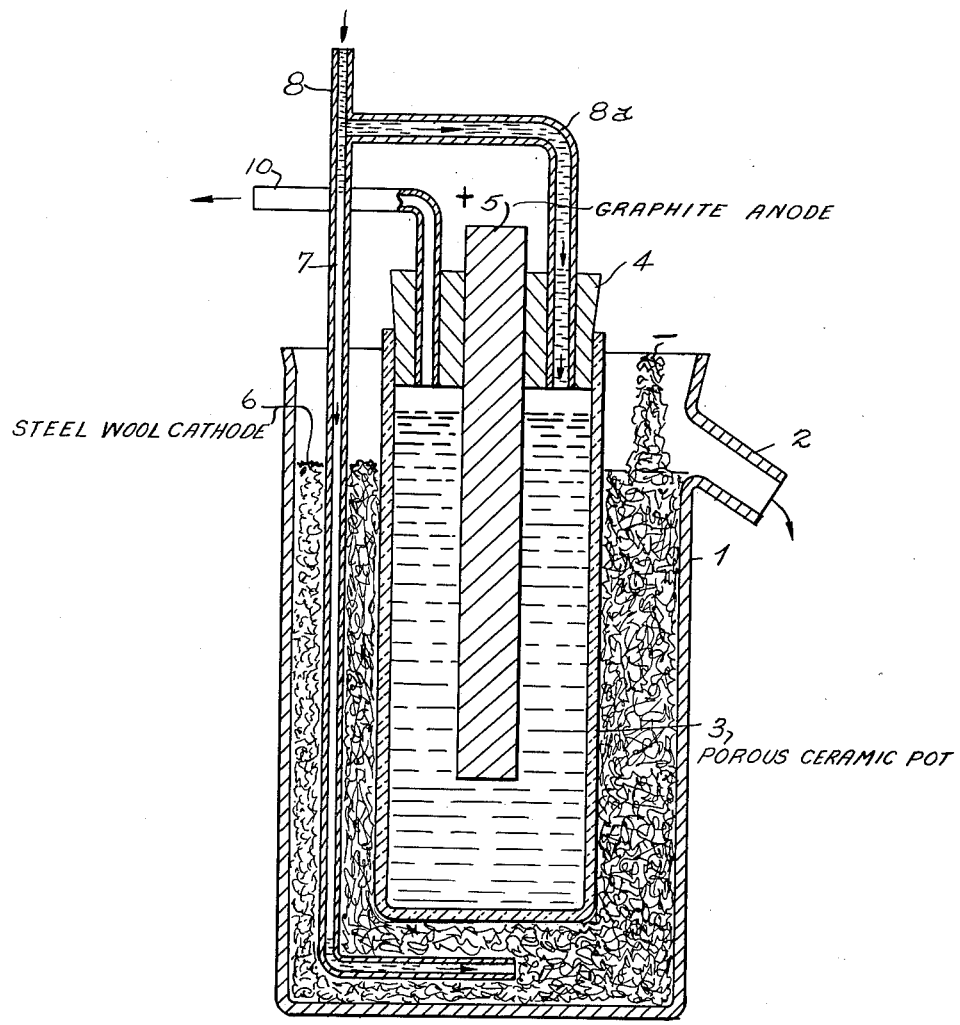

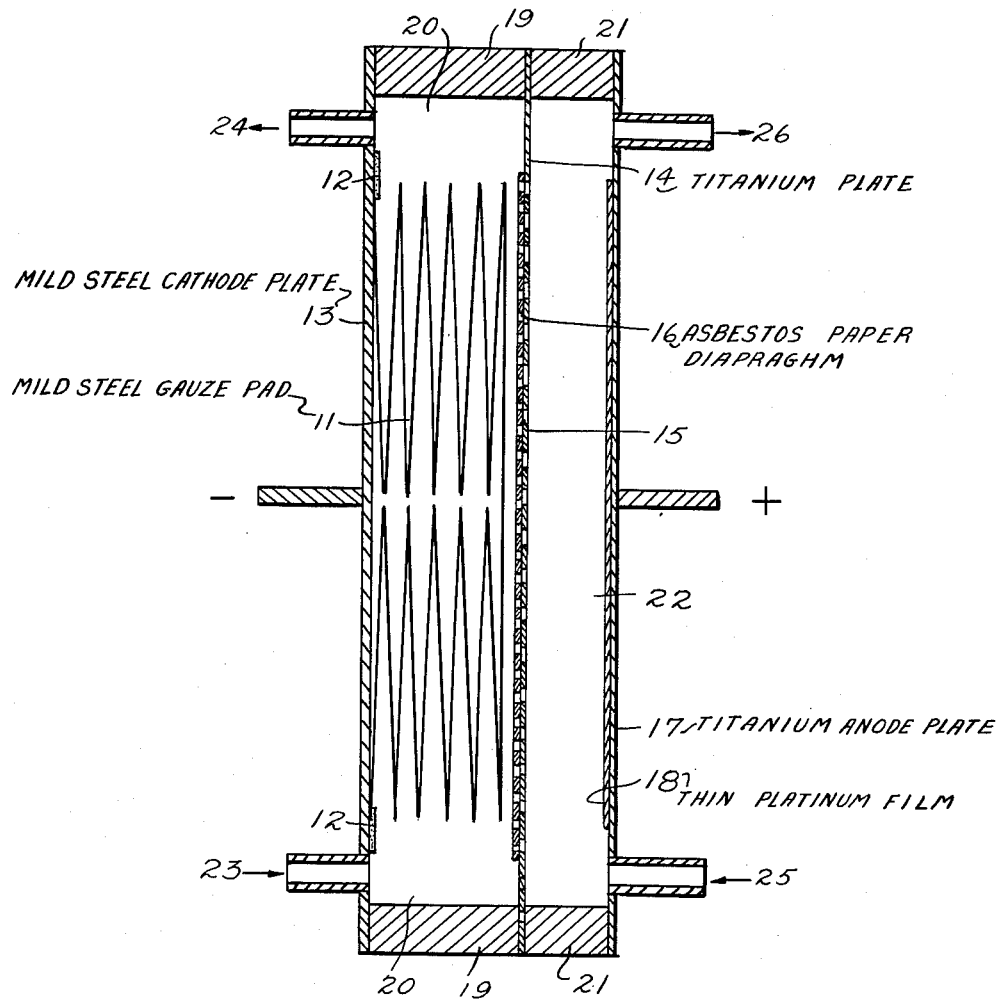

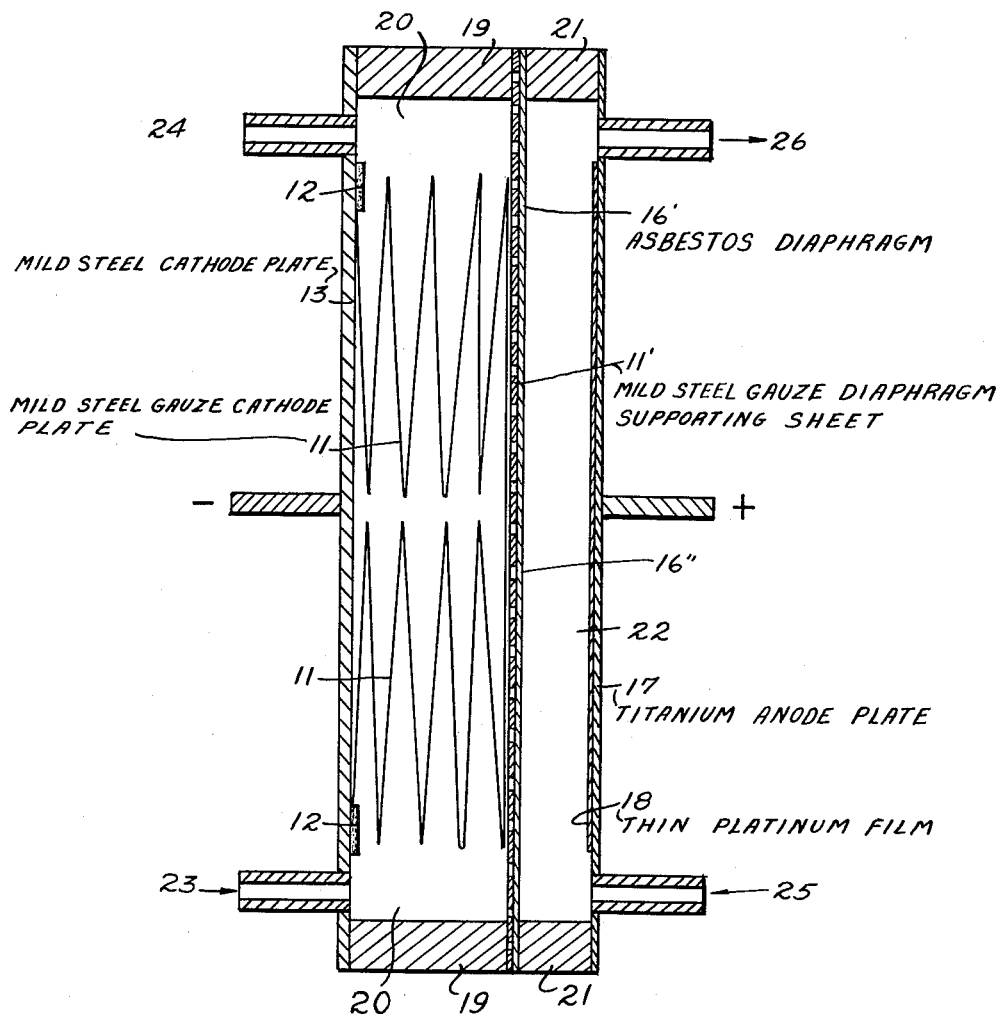

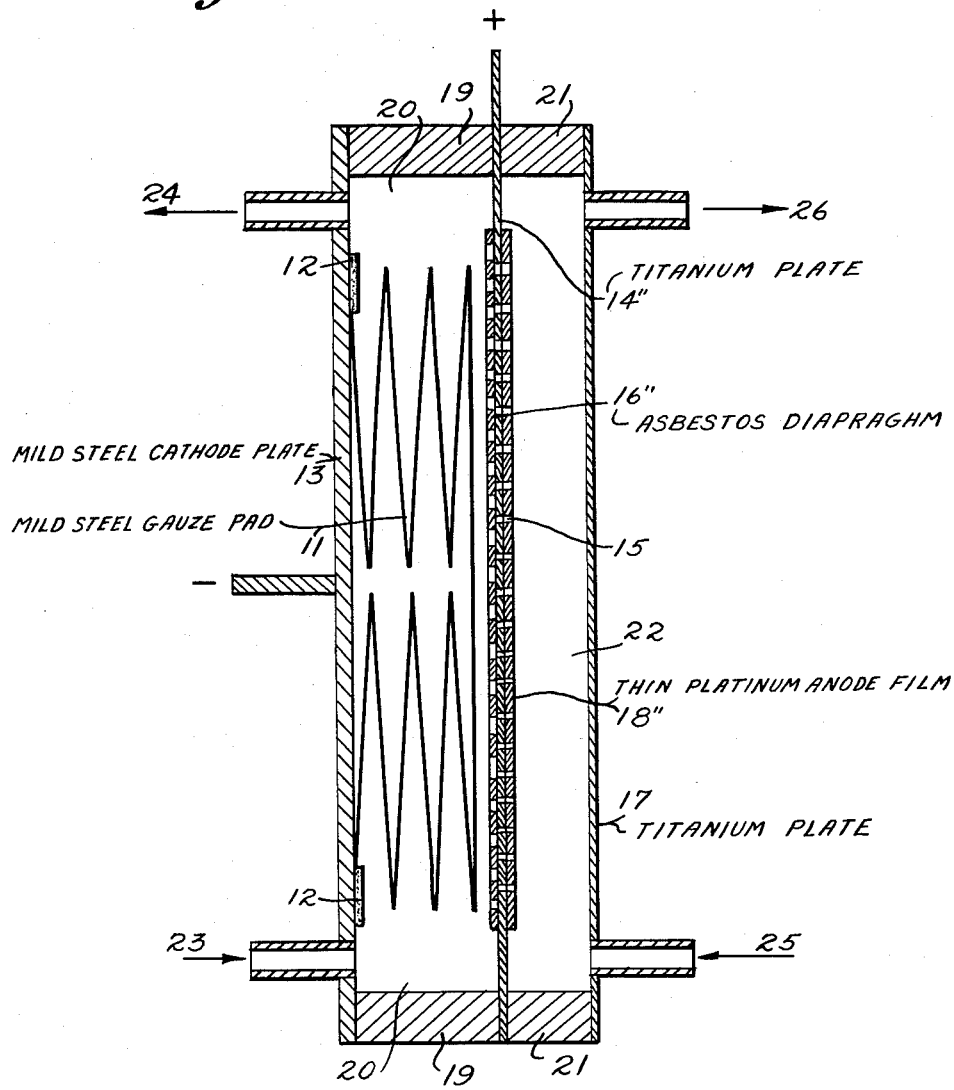

United States Patent Office 3,102,085
Patented Aug. 27, 1963

3,102,085
TREATMENT OF BRINE SOLUTIONS
George Ernest Edwards and Norman James LePage, Widnes, England, assignors to Imperial Chemical Industries Limited, London, England, a corporation of Great Britain
Filed June 18, 1959, Ser. No. 821,279
Claims priority, application Great Britain June 27, 1958
35 Claims. (Cl. 204—128)

The present invention is concerned with a method for the treatment of brine solutions and is particularly concerned with a method which permits the treatment of a brine which contains free and available chlorine and of a brine which contains both free and available chlorine and mercuric chloride.

A continuous process for the removal of free and available chlorine from effluent brine from merceury cells is well known, for instance, wherein to remove most of the free and available chlorine from an effluent brine containing for instance 260 grams per litre sodium chloride the effluent brine is acidified at 80° C., is subjected to reduced pressure at 400 mm. mercury and is blown in towers with air and wherein then to remove the last traces of chlorine the thus treated effluent brine is neutralized with caustic soda and sodium sulphide or sodium bisulphite.

However, an effluent brine from mercury cells may contain by weight for instance about 20% unreacted salt, about 0.06% chlorine and 4 to 50 parts per million mercury.

The object of the present invention is to provide a convenient and economical method which permits recovery of chlorine by at least partial dechlorination of a brine which contains free and available chlorine and which also permits in addition simultaneously recovery of mercury by at least partial removal of mercury from a brine which contains both free and available chlorine and mercuric chloride.

When an electromotive force is applied between inert electrodes immersed in brine two separate electrode processes occur.

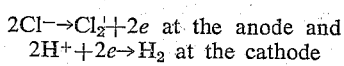

Each of these gas discharge processes can be replaced by other electrode processes leading to no gas discharge. At the cathode, for instance, reducible substances will be reduced even when the applied electromotive force is somewhat lower than the reversible electromotive force of the cell $Cl_2$(gas)/brine/$H_2$(gas) so that, while the anode is unchanged, the reactions

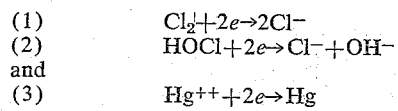

can occur at the cathode instead of hydrogen discharge when free or available chlorine and mercuric ions are present.

If the diffusion path of the chlorine to the cathode is short enough to maintain the supply of free and available chlorine to the cathode surface, the potential of the cathode process will be approximately that of the anode process. Thus the applied electromotive force which is required is theoretically approximately only the sum of the chlorine overvoltage at the anode and the electromotive force required to overcome the ohmic resistance of the brine and of a diaphragm if one is used.

It has now been experimentally ascertained that chlorine and mercury can be removed simultaneously or concurrently from the effluent brine of mercury cells by flowing the effluent brine through the cathode compartment of for instance a diaphragm cell having a graphite anode and a steel wool cathode wherein an E.M.F. is applied between the anode and the cathode at least equal to the sum of the overvoltage of the chlorine at the anode and of the electromotive force required to overcome the ohmic resistance of the brine.

According to the present invention the method which permits recovery of chlorine by removal of at least a substantial portion of free and available chlorine from a brine which contains free and available chlorine comprises applying to the electrodes in a cell containing said brine wherein the anode is substantially unattacked by chlorine and chlorinated brine and the cathode is substantially unattacked by chlorinated brine an electromotive force at least sufficient to cause current to pass between the electrodes and not so high as to cause any substantial hydrogen discharge at the cathode and collecting the free chlorine evolved.

For a cathode which is attackable by chlorinated brine according to a modification of the method of the invention the applied electromotive force for any current density which is developed must be at least sufficiently high to prevent attack of the cathode by the chlorinated brine while still not so high as to cause any substantial discharge at the cathode.

The anode may be graphite, a noble metal of the platinum group or a deposit of a noble metal of the platinum group on titanium as claimed inter alia in copending United States applications Serial No. 780,882 and Serial No. 793,687. The anode may also be a deposit of a platinum metal on titanium.

The cathode is preferably in a form which ensures that the diffusion path of the chlorine to the cathode is short enough to maintain the supply of free and available chlorine to the cathode surface and may be for instance of steel, mild steel, titanium, graphite, mercury or alkali metal amalgam. The steel or mild steel or titanium may be for instance in the form of gauze or wool or foraminous sheet.

Said cell may be of the diaphragm cell kind in which the diaphragm may be for instance a ceramic pot or an asbestos diaphragm which is either deposited on or attached to a mild steel gauze in electrical connection with a mild steel gauze cathode or attached to a support which is unattacked by chlorine and chlorinated brine, such as titanium or foraminous titanium metal sheet the remote side of which is coated with a platinum metal and forms the anode of the cell.

The method of the present invention may be applied for instance directly to recovery of both chlorine and mercury and the removal of both free and available chlorine and mercury from an exit brine from a mercury brine cell and indirectly to the upgrading of weak chlorine gas. To accomplish the latter the chlorine of the weak chlorine gas is absorbed in brine and the dissolved chlorine is then removed as strong chlorine gas by applying the process of the present invention to the chlorinated brine thus formed. Both the step of absorbing the weak chlorine gas in brine and the step of removing the dissolved chlorine from the formed chlorinated brine may be carried out for instance in a tower which is in the form of an electrolytic cell having an anode substantially unattacked by chlorine and chlorinated brine and a cathode substantially unattacked by chlorinated brine or an anode as aforesaid and a cathode attacked by chlorinated brine.

To the former electrolytic cell and electromotive force is applied to the electrodes at least sufficient to cause current to pass between the electrodes and not so high as to cause any substantial hydrogen discharge at the cathode and the free chlorine evolved is collected. To the latter electrolytic cell an electromotive force is applied to the electrodes, for any current density which is developed, at least sufficiently high to prevent attack of the cathode by the chlorinated brine while still not so high as to cause any substantial discharge at the cathode and the free chlorine evolved is collected.

By way of example the method of the invention may be carried out in laboratory cells illustrated in FIGURES 1 and 2 of the diagrammatic drawings accompanying the provisional specification wherein 1 is a glass vessel which is provided with an overflow 2, 3 is a porous ceramic pot which is closed by a plug 4 and which separates the graphite anode 5 within it from the outer annular space within the glass vessel 1. Said annular space is packed with steel wool 6 which acts as cathode. 7 is brine from a laboratory mercury cell (not shown).

In FIGURE 1 there is catholyte-anolyte flow as the brine 7 enters the glass vessel 1 as chlorinated brine through tube 8, passes through the walls of the porous ceramic pot 3 to fill this pot up to the overflow level of the overflow 2 and is bled off from within porous ceramic pot 3 as chlorinated brine by anolyte bleed pipe 9. On the application of a suitable electromotive force the brine 7 leaves the glass vessel 1 as dechlorinated brine at the overflow 2. 10 is a pipe for chlorine gas which is formed within the porous ceramic pot 3 on the application of said electromotive force. Mercury is deposited on the steel wool cathode 6.

In FIGURE 2 there is anolyte-catholyte flow as the brine 7 enters the glass vessel 1 and the porous ceramic pot 3 as chlorinated brine passes through tube 8 and branch tube 8a respectively. The quantity of brine 7 which enters the porous ceramic pot 3 is only a small fraction of the total brine flow through the glass vessel 1. On the application of a suitable electromotive force the brine 7 leaves the glass vessel 1 as dechlorinated brine at overflow 2 and the chlorine gas which is formed in the porous pot 3 leaves by the pipe 10. Mercury is deposited on the steel wool cathode 6.

By way of example the method of the invention may also be carried out in a cell illustrated in the diagrammatic drawing attached hereto and referred to as FIGURE 3 wherein 11 is a mild steel gauze pad, both ends 12 of which and the sides of which (not shown) are soldered to a mild steel cathode plate 13. 14 is a titanium plate the middle portion 15 of which is foraminous. An asbestos paper diaphragm 16 is held between the mild steel gauze pad 11 and the foraminous portion 15 of the titanium plate 14. 17 is a titanium anode plate on the inner surface of which is deposited a thin film of platinum 18. A rubber spacing gasket 19 is fitted between the mild steel cathode plate 13 and the titanium diaphragm support plate 14 to form the catholyte compartment 20. Another rubber spacing gasket 21 is fitted between the diaphragm support plate 14 and the titanium anode plate 17 to form the anolyte compartment 22. Brine containing dissolved chlorine and combined mercury is fed to the catholyte compartment 20 through the inlet 23, passes through the mild steel gauze pad 11 and leaves the cell through the outlet 24. The anolyte compartment 22 is filled with brine through the inlet 25. On application of a suitable electromotive force the brine leaves the catholyte compartment 20 as dechlorinated brine and chlorine gas passes out of the anolyte compartment 22 through the outlet 26. Mercury is deposited on the steel gauze pad 11.

FIGURE 4 is another embodiment of this invention, similar in construction to FIGURE 3 above with the exception that there is no titanium plate 14 but an asbestos diaphragm 16' is either deposited on or attached to a mild steel gauze sheet 11' which is in electrical connection with mild steel gauze cathode pad 11.

If desired, the cell illustrated in FIGURE 3 can be modified by depositing the thin film of platinum 18 on the face of the foraminous titanium diaphragm support 15 remote from the asbestos diaphragm 16 and by making the support plate 14 the anode of the cell instead of the titanium plate 17, as illustrated in FIGURE 5 wherein asbestos diaphragm 16" is attached to titanium support plate 14" which has a platinum metal coating 18" on the remote side thereof.

The following examples illustrate how the invention can be effected, Examples 1 and 2 with reference to FIGURE 2 and Examples 4 and 5 with reference to FIGURE 3.

Example 1

Exit brine from a laboratory mercury cell containing 0.059% chlorine and 0.00031% mercury is passed into a cell as illustrated in FIGURE 2 and comprising a graphite anode, an asbestos fibre diaphragm deposited on a mild steel gauze support and a mild steel wool cathode. An electromotive force of 2.25 v. is applied and a current is passed at an anodic current density of 0.01 ka./m.$^2$. The brine which leaves the cathode compartment contains 0.00002% mercury but no chlorine. Strong chlorine gas is evolved from the anode.

Example 2

Exit brine containing 0.044% chlorine and 0.0028% mercury is passed into a cell as illustrated in FIGURE 2 and comprising a graphite anode, an asbestos paper diaphragm supported on mild steel gauze and a mild steel gauze cathode. An electromotive force of 2.45 v. is applied and a current is passed at an anodic current density of 0.2 ka./m.$^2$. The brine which leaves the cell contains less than 0.0006% chlorine and 0.00007% mercury. The gas which leaves the cell contains 88–97% chlorine by volume.

Example 3

A gas stream containing about 10% chlorine by volume is passed into the cathode compartment of a cell comprising a graphite anode, a porous ceramic diaphragm and a mild steel gauze cathode. A slow stream of brine is fed to the anode compartment, is passed through the diaphragm and overflows from the top of the cathode compartment. An electromotive force of 2.35 v. is applied and a current is passed at an anodic current density of about 0.08 ka./m.$^2$. The gas stream which leaves the anode compartment contains 89–98.5% chlorine by volume and the gas stream which leaves the cathode compartment contains less than 2% chlorine by volume.

Example 4

Brine containing 0.029% chlorine is passed at a rate of 3 l./hr. into the cathode compartment of a filter press type of cell as illustrated in FIGURE 3 and comprising a mild steel gauze cathode soldered to a mild steel cathode plate, an asbestos paper diaphragm supported on titanium expanded metal and a titanium plate anode on which a thin film of platinum has been electrodeposited. An electromotive force of 2.35 v. is applied and a current is passed at an anodic current density of about 0.17 ka./m.$^2$. The brine which leaves the cell contains 0.0061% chlorine.

Example 5

Exit brine from a mercury cell containing 0.032% chlorine and 0.00055% mercury is passed at a rate of 6 l./hr. into the cathode compartment of a filter press type of cell as illustrated in FIGURE 3 and comprising a mild steel gauze cathode soldered to a mild steel cathode plate, an asbestos paper diaphragm supported on titanium expanded metal on the reverse side of which a thin film of platinum has been electrodeposited so that the diaphragm support also forms the anode of the cell. An electromotive force of 2.4 v. is applied to the cell and a current is passed at an anodic current density of about 0.08 ka./m.$^2$. The brine which leaves the cell contains 0.0006% chlorine and 0.00025% mercury.

The following table is a record of the exeprimental results which are obtained at various electromotive forces and at various current densities and at stipulated rates and directions of flow with a brine leaving a laboratory mercury cell for the two cells illustrated in FIGURES 1 and 2 of said diagrammatic drawings when working according to the process of the present invention. The results are for the cell illustrated in FIGURE 1 or FIGURE 2 according as to whether there is catholyte- anolyte (C–A) or anolyte-catholyte (A–C) flow of brine through the cell.

| Applied E.M.F. (v.) | Current density (ka/m)$^2$ | Brine flow rate (ml./min.) | Direction of flow | Additives to brine feed | Chlorine (leaving polarizer) | | Mercury (leaving polarizer) | | Other observations |
|---|---|---|---|---|---|---|---|---|---|
| | | | | | Concentration (p.p.m.) | Percent removal | Concentration (p.p.m.) | Percent removal | |
| 2.0 | 0.07–0.11 | about 100 | C–A | none | 10 | 95 | 0.5 | 30 | steel rusty. |
| 2.25 | 0.13 | ---do--- | ---do--- | -----do----- | 10 | 95 | 0.3 | 60 | |
| 2.5 | 0.25 | ---do--- | ---do--- | -----do----- | 10 | 95 | 0.5 | 30 | hydrogen evolved. |
| 2.25 | 0.06 | 44 | ---do--- | -----do----- | not detected | 100 | 0.1 | 90 | |
| 2.25 | 0.13–0.14 | about 100 | ---do--- | HCL to neutralize alkalinity in brine. | 24 | 88 | 0.9 | 75 | |
| 2.25 | 0.13–0.14 | ---do--- | A–C | | 29 | 85 | 1.1 | 65 | |
| 2.25 | 0.13–0.14 | ---do--- | ---do--- | HgCl$_2$ solution | 18 | 95 | 1.4 | 80 | |

From the table it is seen that at an applied electromotive force of 2.0 volts and an anodic current density of about 0.1 ka./m.$^2$ the steel wool is attacked while at 2.5 volts and a current density of 0.25 ka./m.$^2$ hydrogen is evolved at the cathode; that at 2.25 volts and 0.13–0.14 ka./m.$^2$ current density, at 2.0 volts and about 0.1 ka./m.$^2$ current density, and at 2.5 volts and 0.25 ka./m.$^2$ current density all at a rate of flow of the brine at about 100 ml./min. about 95% of the chlorine is removed but only 30–60% mecrcury; that for an applied e.m.f. of 2.5 volts at a current density of 0.06 ka./m.$^2$ when the rate of flow of the brine is 44 ml./min. there is complete removal of chlorine and 90% removal of mercury; that the addition of hydrochloric acid to neultralize the slight alkalinity of the brine reduces the efficiency of removal of both chlorine and mercury; and that the direction in which a small fraction of the brine is passed through the porous ceramic pot is apparently unimportant.

In addition to the experimental results which are recorded in the table it has been experimentally ascertained that a steel cathode requires the application of an electromotive force greater than 2.0 volts to protect it from attack from chlorine and that no hydrogen discharge occurs as long as the electromotive force which is applied is kept below 2.3 volts.

The method of the invention largely eliminates loss of mercury and chlorine in effluent brine of mercury cells and simplifies disposal or re-use of the effluent brine.

What we claim is:

1. A process for the purification of brine containing free and available chlorine and for the recovery of said chlorine which comprises the steps of flowing said brine through a cathode compartment of an electrolytic diaphragm cell having an anode which is substantially unattacked by chlorine and chlorinated brine and a cathode which is substantially unattacked by chlorinated brine, applying to said electrodes an electromotive force sufficient to cause current to pass between the anode and the cathode, thereby electrolytically converting free and available chlorine in said brine to the ionic state at the cathode, said electromotive force being sufficient to cause evolution of free chlorine at the anode but insufficient to cause any substantial hydrogen discharge at the cathode and collecting free chlorine gas evolved at the anode.

2. The process of claim 1 carried on with a cathode which is attackable by chlorinated brine and which is further characterized in that the applied electromotive force for any current density which is developed is at least sufficiently high to prevent attack on the cathode by the chlorinated brine but below such high intensity that would cause any substantial hydrogen discharge at the cathode.

3. The process of claim 1 wherein the brine is effluent brine from a mercury cell, said brine is flowed through the cathode compartment of a diaphragm cell having a graphite anode and a steel cathode and an electromotive force is applied between the anode and cathode at least equal to the sum of the overvoltage of the chlorine at the anode and of the electromotive force required to overcome the ohmic resistance of the brine.

4. A method as claimed in claim 1 wherein the anode is graphite.

5. A method as claimed in claim 1 wherein the anode is a noble metal of the platinuum group.

6. A method as claimed in claim 1 wherein the anode is a deposit of a noble metal of the platinum group on titanium.

7. A method as claimed in claim 6 wherein the anode is a deposit of platinum metal on titanium.

8. A method as claimed in claim 1 wherein the cathode is in a form which ensures that the diffusion path of the chlorine to the cathode is short enough to continuously maintain the supply of free and available chlorine to the cathode surface.

9. A method as claimed in claim 1 wherein the cathode is of a member of the group consisting of steel, mild steel, titanium, graphite, mercury and alkali metal amalgam.

10. A method as claimed in claim 9 wherein the steel, mild steel and titanium are in the form of a member of the group consisting of gauze, wool and foraminous sheet.

11. A method as claimed in claim 1 wherein the diaphragm in said cell is supported on a material which is unattacked by chlorine and chlorinated brine.

12. A method as claimed in claim 11 wherein said diaphragm-supporting material is titanium.

13. A method as claimed in claim 11 wherein said diaphragm-supporting material is foraminous titanium metal sheet the remote side of which is coated with a platinum metal which forms the anode of the cell.

14. A method as claimed in claim 1 wherein the diaphragm in said cell is a ceramic pot.

15. A method as claimed in claim 1 wherein the diaphragm in said cell is an asbestos diaphragm which is deposited on a mild steel gauze in electrical connection with a mild steel gauze cathode.

16. A method as claimed in claim 1 wherein the diaphragm in said cell is an asbestos diaphragm which is attached to a mild steel gauze in electrical connection with a mild steel gauge cathode.

17. A method as claimed in claim 1 when applied directly to recovery of both chlorine and mercury and the removal of both free and available chlorine and mercury from an exit brine from a mercury cell.

18. A process for the upgrading of weak chlorine gas which comprises absorbing the weak chlorine gas in brine and recovering the dissolved chlorine from the chlorinated brine as strong chlorine gas by flowing said brine through a cathode compartment of an electrolytic diaphragm cell having an anode which is substantially unattacked by chlorine and chlorinated brine and a cathode which is substantially unattacked by chlorinated brine, applying to said electrodes an electromotive force sufficient to cause current to pass between the anode and the cathode, thereby electrolytically converting free and available chlorine in said brine to the ionic state at the cathode, said electromotive force being sufficient to cause evolution of free chlorine at the anode but insufficient to cause any substantial hydrogen discharge at the cathode, and collecting the free chlorine gas evolved at the anode.

19. A method as claimed in claim 18 wherein both the step of absorbing the weak chlorine gas in brine and the step of recovering the dissolved chlorine from the formed chlorinated brine are carried out in a tower which is in the form of an electrolytic cell having an anode substantially unattacked by chlorine and chlorinated brine and a cathode substantially unattacked by chlorinated brine.

20. A method as claimed in claim 18 wherein both the step of absorbing the weak chlorine gas in brine and the step of recovering the dissolved chlorine from the formed chlorinated brine are carried out in a tower which is in the form of an electrolytic cell having an anode substantially unattacked by chlorine and chlorinated brine and a cathode which is attackable by chlorinated brine.

21. The process of claim 18 carried on with a cathode which is attackable by chlorinated brine and which is further characterized in that the applied electromotive force for any current density which is developed is at least sufficiently high to prevent attack of the cathode by the chlorinated brine but below such high intensity that would cause any substantial hydrogen discharge at the cathode.

22. The process of claim 18 wherein the brine is effluent brine from a mercury cell, said brine is flowed through the cathode compartment of a diaphragm cell having a graphite anode and a steel cathode and an electromotive force is applied between the anode and cathode at least equal to the sum of the overvoltage of the chlorine at the anode and of the electromotive force required to overcome the ohmic resistance of the brine.

23. A method as claimed in claim 18 wherein the anode is graphite.

24. A method as claimed in claim 18 wherein the anode is a noble metal of the platinum group.

25. A method as claimed in claim 18 wherein the anode is a deposit of a noble metal of the platinum group on titanium.

26. A method as claimed in claim 18 wherein the anode is a deposit of platinum metal on titanium.

27. A method as claimed in claim 18 wherein the cathode is in a form which ensures that the diffusion path of the chlorine to the cathode is short enough to continuously maintain the supply of free and available chlorine to the cathode surface.

28. A method as claimed in claim 18 wherein the cathode is of a member of the group consisting of steel, mild steel, titanium, graphite, mercury and alkali metal amalgam.

29. A method as claimed in claim 28 wherein the steel, mild steel and titanium are in the form of a member of the group consisting of gauze, wool and foraminous sheet.

30. A method as claimed in claim 18 wherein the diaphragm in said cell is supported on a material which is unattacked by chlorine and chlorinated brine.

31. A method as claimed in claim 30 wherein said diaphragm-supporting material is titanium.

32. A method as claimed in claim 30 wherein said diaphragm-supporting material is foraminous titanium metal sheet the remote side of which is coated with a platinum metal which forms the anode of the cell.

33. A method as claimed in claim 18 wherein the diaphragm in said cell is a ceramic pot.

34. A method as claimed in claim 18 wherein the diaphragm in said cell is an asbestos diaphragm which is deposited on a mild steel gauze in electrical connection with a mild steel gauze cathode.

35. A method as claimed in claim 18 wherein the diaphragm in said cell is an asbestos diaphragm which is attached to a mild steel gauze in electrical connection with a mild steel gauze cathode.

References Cited in the file of this patent

UNITED STATES PATENTS

| | | |
|---|---|---|
| 470,181 | Collins | Mar. 8, 1892 |
| 1,246,099 | Hulin | Nov. 13, 1917 |
| 1,427,236 | Sherwood | Aug. 29, 1922 |
| 1,847,435 | Low | Mar. 1, 1932 |
| 2,370,871 | Marks | Mar. 6, 1945 |
| 2,447,834 | Balcar | Aug. 24, 1948 |
| 2,468,766 | Low | May 3, 1949 |
| 2,651,612 | Haller | Sept. 8, 1953 |
| 2,750,002 | Hooker et al. | June 12, 1956 |
| 2,861,040 | Buchanan et al. | Nov. 18, 1958 |
| 2,945,791 | Gibson | July 19, 1960 |
| 2,967,807 | Osborne et al. | Jan. 10, 1961 |

OTHER REFERENCES

Journal of Chemical Education, March 1953, pages 116–120.

Chlorine Handbook, page 40, Diamond Alkali Co., Cleveland, Ohio.